Feb. 14, 1956 E. V. BARKER 2,734,754
PIVOTALLY-CONNECTED DRAFT TONGUE WITH
SELECTIVE STEERING MECHANISM
Filed Feb. 17, 1953 4 Sheets-Sheet 1

INVENTOR.
EROS V. BARKER
BY
ATTORNEYS

Feb. 14, 1956  E. V. BARKER  2,734,754
PIVOTALLY-CONNECTED DRAFT TONGUE WITH
SELECTIVE STEERING MECHANISM
Filed Feb. 17, 1953  4 Sheets-Sheet 2
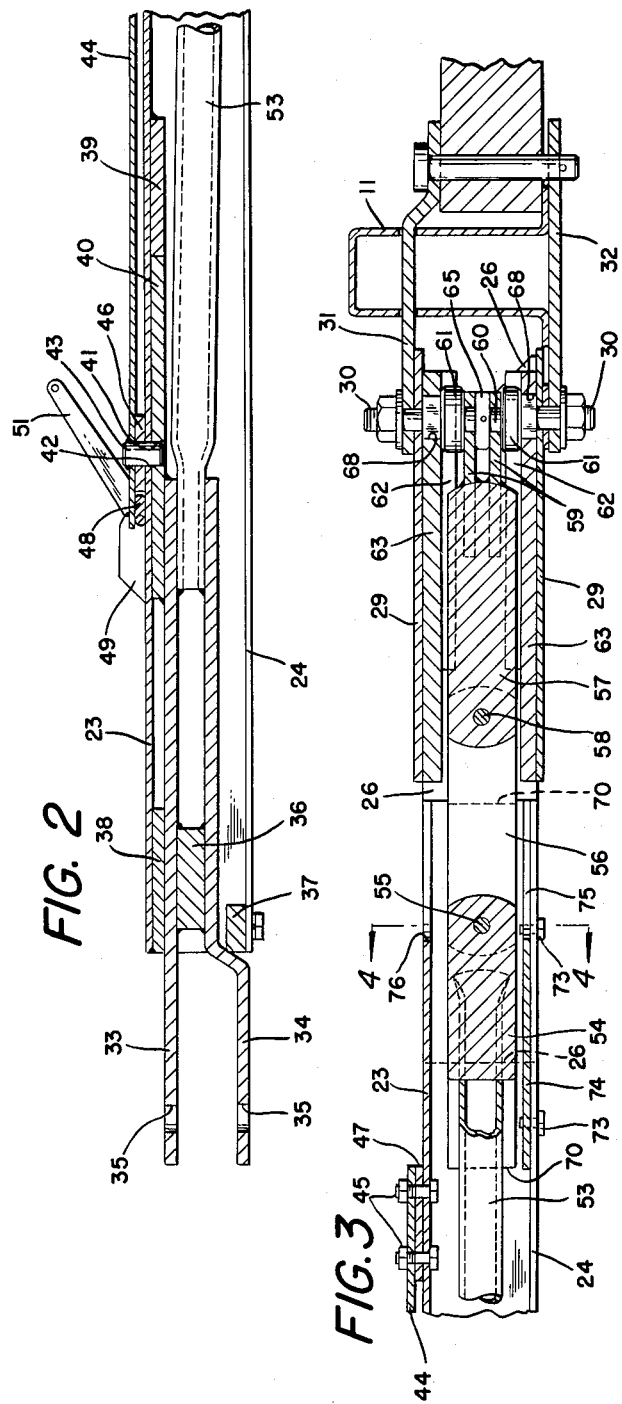
FIG. 2
FIG. 3
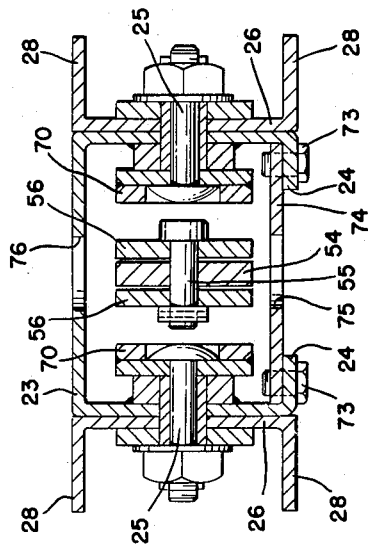
FIG. 4
INVENTOR.
EROS V. BARKER
BY
ATTORNEYS

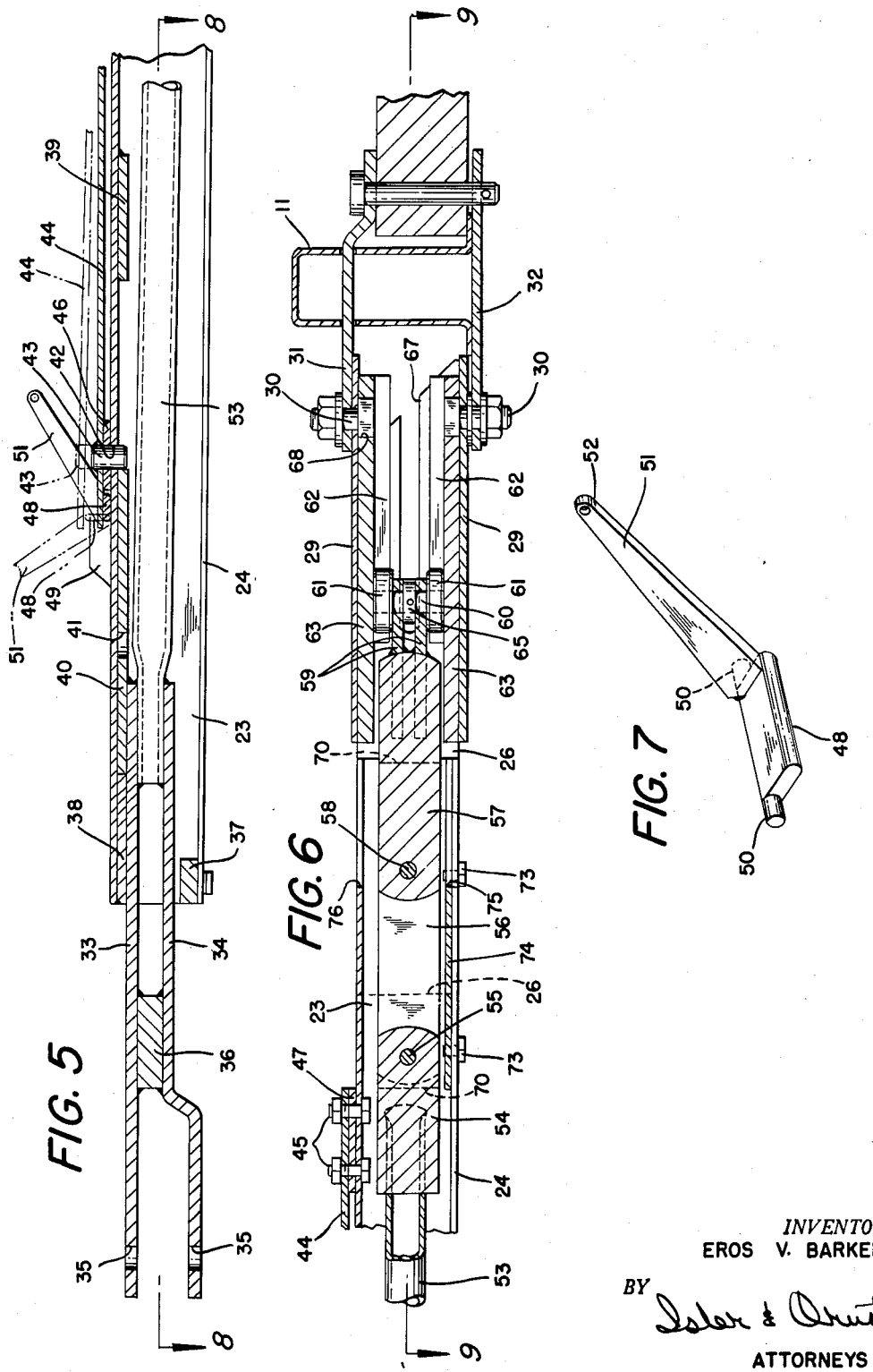

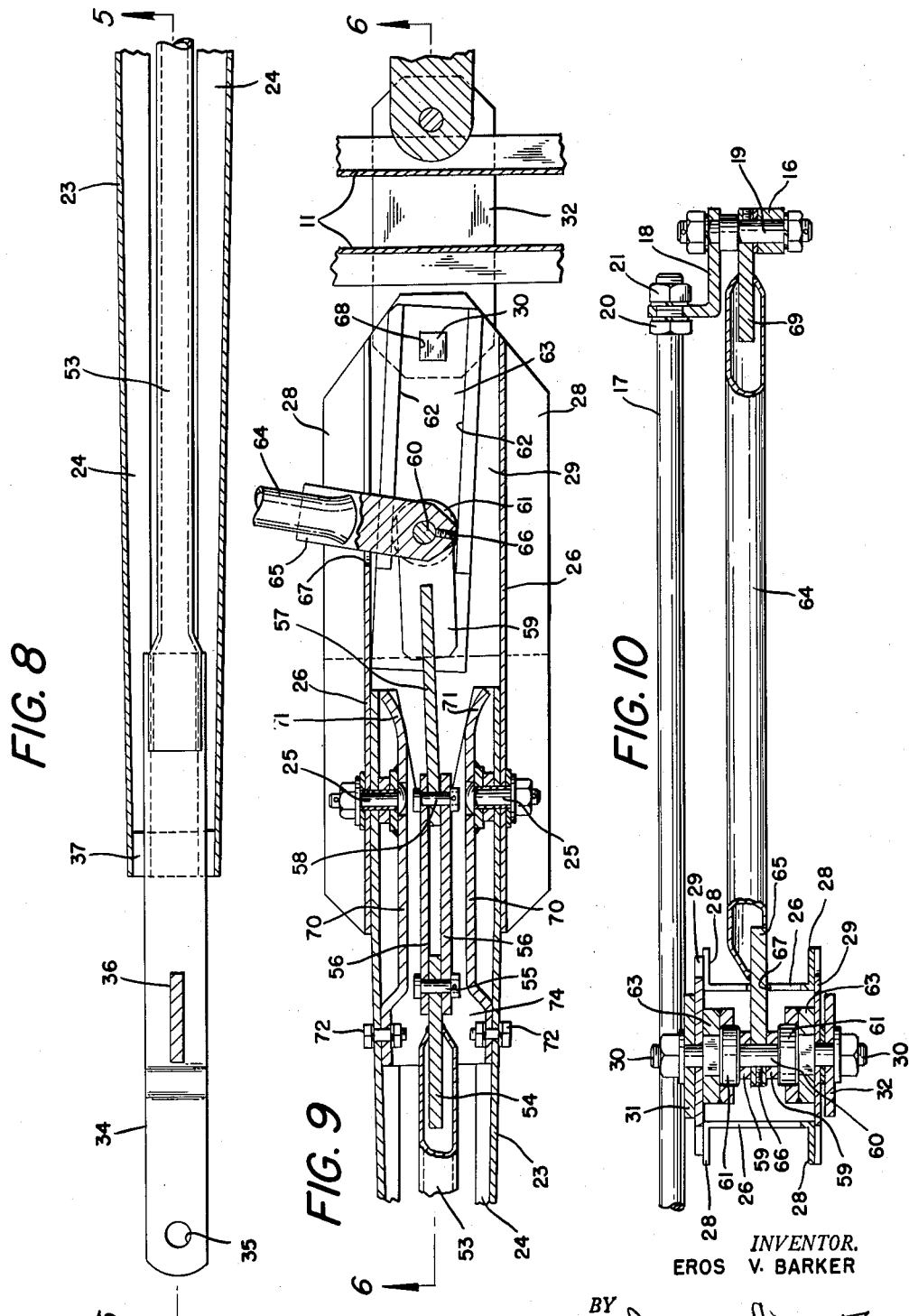

United States Patent Office 2,734,754
Patented Feb. 14, 1956

2,734,754

PIVOTALLY-CONNECTED DRAFT TONGUE WITH SELECTIVE STEERING MECHANISM

Eros V. Barker, Galion, Ohio, assignor to The Cobey Corporation, Galion, Ohio, a corporation of Ohio Application February 17, 1953, Serial No. 337,258

14 Claims. (Cl. 280—103)

This invention relates in general to a tongue having shiftable mechanism for controlling the steering of a wheeled drawn vehicle.

The invention has particular application to four-wheel farm utility wagons or the like which are generally connected and drawn by a prime mover such as a tractor. Such wagons are utilized for many tasks in and around the farm and are generally provided with radius turning or steering mechanism which is responsive to horizontal pivotal movement of the tongue. The spindle-type of turning mechanism is preferred over the axle-type of turning mechanism because it gives greater stability to the vehicle.

Whenever such drawn vehicles have to be backed into a particular spot, the operator encounters considerable difficulty and annoyance, unless he is exceptionally skilled in maneuvering the prime mover. Such effects as weaving and jack-knifing are common and well known. If the wheels of the vehicle are locked in a fixed position, the difficulties of reversing or backing the vehicle are substantially overcome.

Accordingly, it is the primary object of my invention to provide a draft tongue having means for selectively engaging or disengaging from the steering mechanism.

Another object of my invention is to provide means of the character described which will lock the steered wheels in a square or aligned position with the other wheels of the vehicle.

Still another object of my invention is to provide means of the character described which will at all times remain in physical connection with the steering mechanism but which can be shifted to a non-responsive or neutral position.

Other objects and advantages of my invention will be apparent during the course of the following description.

In the accompanying drawings, forming a part of this specification, and in which like numerals are employed to designate like parts throughout the same, Fig. 1 is a top plan view of a draft tongue embodying the features of my invention, showing the tongue secured to the axle and steering mechanism of a drawn vehicle.

Fig. 2 is a longitudinal cross-sectional view of the forward portion of the tongue, taken on line 2—2 of Fig. 1.

Fig. 3 is a longitudinal cross-sectional view showing the remainder of the tongue, taken on line 3—3 of Fig. 1.

Fig. 4 is a transverse cross-sectional view of the shifting mechanism of the tongue, taken on line 4—4 of Fig. 1.

Fig. 5 is a view similar to Fig. 2 but showing the parts in steering position.

Fig. 6 is a view similar to Fig. 3 but showing the parts in steering position.

Fig. 7 is a detail perspective view of the latch lever utilized in the illustrated embodiment of my invention.

Fig. 8 is cross-sectional view taken on line 8—8 of Fig. 5.

Fig. 9 is a cross-sectional view taken on line 9—9 of Fig. 6.

Fig. 10 is a fragmentary longitudinal cross-sectional view of the steering mechanism taken on line 10—10 of Fig. 1, and showing the steering rod in neutral position.

Figure 1:
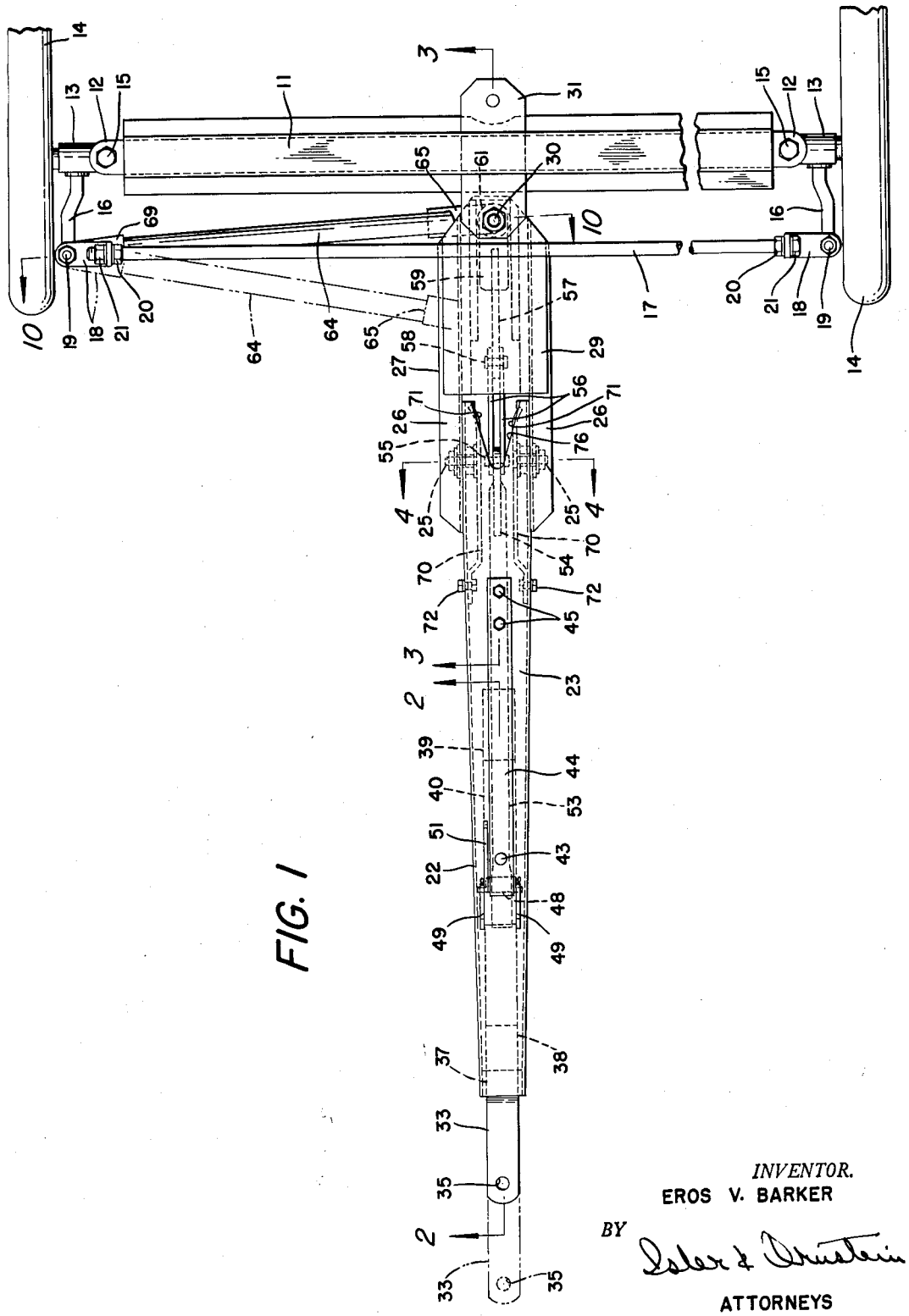

Referring more particularly to the drawings, I have shown in Fig. 1 the forward portion of a farm wagon including a box member 11 which serves as an axle on the ends 12 of which are pivotally mounted the wheel spindles 13 and the wheel assemblies 14 for turning movement about a vertical pin 15.

Projecting laterally from the spindle 13 is a steering arm 16 which has pivotally secured to the free end thereof a tie bar 17, through the intermediary of an angle bracket 18 and pivot pin 19. The tie bar 17 links the two steering arms 16 together for synchronous movement. The ends of the tie bar are threaded and provided with adjusting nuts 20 and lock nuts 21 which permit adjustment of the effective length of the tie bar for purposes of effecting proper correlation of the turning movement of the wheel assemblies 14. It is to be noted that the tie bar 17 is not secured to the tongue of the vehicle, as is the case in conventional steering mechanisms.

Referring more particularly to Figs. 1–4 and 8–9 of the drawings, the tongue assembly 22 includes a tongue housing or body 23 which is a channel-shaped structural member having inturned flanges 24 defining an open side. The body 23 is pivotally secured, as by bolts 25, between the horizontally-spaced side plates 26 of a shifter assembly 27. The plates 26 are provided with vertically-spaced flanges 28 to which are welded upper and lower track supporting plates 29. The plates 29 are pivotally secured, as by bolts 30, between an upper hitch plate 31 and a lower hitch plate 32 which are rigidly secured to the axle 11, as by welding. The tongue body 23 thus is pivotally movable in a vertical plane about the axis of bolts 25, and is also pivotally movable in a horizontal plane about the axis of the bolts 30.

Slidably mounted in the forward end of the tongue body 23, and projecting therefrom, are two vertically-spaced tow bars 33 and 34 which are apertured at their free ends, as at 35, for convenience in connecting them to a tractor or the like. The tow bars are integrated with each other by means of a common spacer block 36 to which each of the bars is welded. A tow bar support block 37 is secured to the flanges 24 across the forward end of the tongue body 23 and serves as a rest for the lower tow bar 34.

A stop plate 38 is welded to the interior of the upper surface of the tongue body 23 adjacent the forward end thereof, so that it overlies the tow bar 33. Another stop plate 39 is also welded to the tongue body 23 in longitudinally-spaced relationship to the plate 38. Intermediate the plates 38 and 39, a latch plate 40, which is provided with an opening 41, is secured, as by welding, to the upper tow bar 33.

The stop plates 38 and 39 are so located that when the tow bars are moved rearwardly in the tongue body 23, the plate 40 will abut the stop plate 39 to limit the rearward movement of the tow bars 33 and 34. At the point of abutment of the plates 39 and 40, the aperture 41 in latch plate 40 will be in registry with an aperture 42 in the tongue body 23, through which a latch pin 43 projects, thereby locking the plate 40 against countermovement.

The latch pin 43 is secured to a resilient arm 44, one end of which is secured to the tongue body 23, as by bolts 45. Suitable spacers 46 and 47 may be interposed between the spring arm 44 and the tongue body. The free end of the spring arm 44 overlies a cam or lever 48 which is pivotally secured to the tongue body 23 by means of spaced retainers 49 which are welded to body 23. As best seen in Fig. 7, the lever 48 is provided with a stub shaft 50 projecting laterally from either side thereof, and these stub shafts are journalled in the aforementioned retainers 49. The lever 48 is also provided with an operating handle 51 which is provided with an aperture 52 through which may be secured a wire or rope leading to the operator of the tractor.

When the handle 51 is pulled forwardly, as indicated in dotted outline in Fig. 5, the spring arm 44 is raised causing an upward movement of the latch pin 43 and thereby releasing the plate 40 from its locked position.

When the plate 40 is thus released, the tow bars 33 and 34 may be moved forwardly, as indicated in dotted outline in Fig. 1 and as shown in Fig. 5. Forward movement of the tow bars is limited by abutment of plate 40 with stop plate 38. In this forward position, the latch pin 43 projects behind the rear edge of plate 40 and locks the plate against counter-movement.

The spaced tow bars 33 and 34 are fixedly secured, as by welding, to one end of a tow bar extension 53 which is disposed interiorly of the tongue body 23. The other end of the extension 53 is secured, as by welding, to a pivot link 54 which is pivotally secured to pivot pin 55 carried by two horizontally spaced connector bars 56. A second pivot link 57 is pivotally secured to a pivot pin 58 carried by the bars 56 at the other end thereof.

As best seen in Figs. 3, 4, 6 and 9, the link 57 is secured, as by welding, to two vertically-spaced shifter bars 59 which are pivotally secured to a roller shaft 60. At the ends of the shaft 60 are rotatably mounted wheels or rollers 61 which move between the parallel runways 62 of an upper and lower track body 63. The tracks 63 are secured, as by welding, to the inner surfaces of the track supporting plates 29, and, as will be noted in Fig. 9, are disposed at a slight angle to the longitudinal axis of the tongue body 23, for a purpose to be described. The tracks are apertured, as at 68, to receive the heads of the bolts 30, so that they will not interfere with the rollers 61.

A steering rod 64 is pivotally connected by means of a connector 65 to the roller shaft 60, intermediate the shifter bars 59. A lubricant fitting 66 may be provided in the end of connector 65 to permit convenient lubrication of the shaft 60. One of the side plates 26 is provided with a horizontal opening or slot 67 which permits angular or lateral movement of the steering rod 64.

The other end of steering rod 64 is pivotally connected through a connector 69 to the pivot pin 19 of one steering arm 16, as shown in Fig. 10.

Referring more particularly to Fig. 9, there is secured to the rearward end of tongue body 23, interiorly thereof, two horizontally spaced guide bars 70 having outwardly flaring ends 71. Bolts 72 serve to secure one end of each of the bars 70 to the body 23. The bolts 25, which secure tongue body 23 to side plates 26, also serve to secure and retain the guide bars 70. It has been found advisable to utilize the guide bars 70 to define a rectilinear path of movement for the connector bars 56. In order to further enclose the connector bars 56, there is secured to the bottom of tongue body 23, as by cap screws 73 extending through flanges 24, a plate 74 having a triangular recess 75 at its rear edge, so that the recess underlies the link 57. A similar triangular recess 76 is provided in the upper wall of tongue body 23, so that the recess overlies link 57.

The operation of the novel-draft tongue will now be described.

In Figs. 1, 2, 3, 4 and 10 the various parts are shown disposed in neutral or non-steering relationship. In the neutral position, the tow bars 33—34 have been moved rearwardly until the latch plate 40 abuts stop plate 39. This may be accomplished by pulling forwardly on the handle 51 to raise the latch pin 43 and then reversing or backing up the prime mover. When the pin 43 is raised it does not hinder the rearward sliding movement of the tow bars and the parts connected thereto.

As soon as the rearward edge of plate 40 has been moved past the pin 43, the handle 51 may be released. The pin will then ride on the surface of plate 40 until the aperture 41 is aligned therewith, at which time the spring arm 44 will cause the latch pin to drop into the opening 41 to lock the plate 40 against further movement.

The rearward movement of the tow bars is transmitted, through the connecting linkage previously described, to the roller shaft 60 of the shifted assembly 60, thus causing the rollers 61 to move rearwardly on the track 63 until the shaft 60 is in axial alignment with the pivot bolts 30.

The pivot bolts 30 define the vertical axis about which the entire tongue assembly is rotatable. The end of steering rod 64, which is carried by shaft 60, is thus coincident with the vertical axis of rotation of the tongue assembly and will be non-responsive to any horizontal angular movement of the tongue assembly. When the steering rod 64 is thus on dead center, the wheels 14 are locked in square position and will remain so irrespective of the movements of the tongue.

Accordingly, although the tractor, to which the tow bars 33, 34 are secured, may turn and weave while it is backing up, the farm wagon will be insensitive to such movements and will have a straight line movement only. Therefore, once the wagon has been aligned with its destination, it can be moved rearwardly without exercising any special degree of skill.

As previously indicated, the tongue also is permitted vertical movement about a horizontal axis defined by the pivot bolts 25. When the parts are in the neutral or non-steering position, the pivot pin 55 of connector bars 56 is aligned with the axis of bolts 25 so that the tongue assembly 22 can pivot in a vertical plane relatively to the shifter assembly 27. The recesses 76 and 75 provide clearance for the connector bars 56 so that they do not interfere with such pivotal movement.

In Figs. 5, 6, 8 and 9, I have shown the various parts in steering position. When it is desired to shift the steering rod 64 from neutral to operative position, the latch pin 43 is raised by means of lever 48 and handle 51 so that the plate 40 is released from its locked position. The tow bars 33, 34 can then be moved forwardly, as indicated in dotted outline in Fig. 1, until the plate 40 abuts stop plate 38, at which time the latch pin 43 will drop behind the edge of plate 40 and lock it in position.

It may be mentioned at this time that the latch pin 43 can be made inoperative if the lever 48 is rotated past dead center, as indicated in dotted outline in Fig. 5, in which case the spring arm 44 maintains the pin 43 in a raised position. This may be advisable under the circumstances where the wagon must be maneuvered forwardly and rearwardly repeatedly over a short period of time. Under such circumstances the forward movement of the prime mover will retain the steering rod 64 in operative position, and a backing movement of the prime mover will cause the steering rod to move to neutral position. Thus, with the locking effect of the latch pin 43 eliminated, the position of steering rod 64 will be dependent on and responsive to the direction of movement of the prime mover. This arrangement makes it unnecessary for the tractor operator to manipulate the latch handle 51 each time that the steering mechanism is to be shifted. As above-mentioned, this arrangement is recommended for use only under special circumstances, and in ordinary or normal use I prefer to use the latch pin 43 to lock the parts in selected position.

As the tow bars are moved forwardly, the roller shaft 60 and wheels 61 move forwardly on track 63 until they reach the position shown in Figs. 6 and 9. In this position, the end of steering rod 64 is spaced radially from the axis of rotation defined by bolts 30, and the rod 64 will transmit horizontal movement of the tongue assembly to the steering arm 16 to cause turning movement of the wheels 14 in a conventional manner. The degree of movement of the steering rod 64 is, of course, dependent upon its distance, radially from the bolts 30. This distance or radius is fixed for any individual wagon design, but may be changed in other designs by changing the length or location of the stop plate 38 and latch plate 40.

In shifted position, the pivot pin 58 is in alignment with the pivot bolts 25 so that the tongue assembly is still free to pivot in a vertical plane.

As best seen in Fig. 9, the track 63 is located at a slight angle to the longitudinal axis of the tongue assembly to compensate for the arcuate movement of the end of steering rod 64.

From the foregoing description it will be apparent that I have provided a steering mechanism which can be selectively engaged or disengaged by the operator. The steering mechanism is at no time physically disconnected, however, and can, in fact, be made entirely responsive to the forward and rearward thrust exerted on the tongue by a prime mover, as above described. In the neutral or non-operative position of the steering rod, the wheels are locked in a predetermined selected position, which generally is one in which the wheels are square, i. e. aligned to track the rear wheels, so that the vehicle can be backed without its weaving, turning or jack-knifing, even though the prime mover to which it is connected is not maneuvered correctly or skillfully.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. In a wheeled drawn vehicle, the combination of a draft tongue pivotally secured to said vehicle for movement about a vertical axis, a steering rod having one end thereof pivotally and slidably secured to said tongue intermediate said axis and the free end of said tongue, and means for selectively shifting said end of said steering rod into pivotal alignment with said vertical axis.

2. In a wheeled drawn vehicle, the combination of a draft tongue pivotally secured to said vehicle for movement about a vertical axis, a steering rod having one end thereof pivotally and slidably secured to said tongue in radially spaced relationship to said vertical axis, and means, responsive to a rearward thrust upon said tongue, connected with said end of said steering rod to move the same into pivotal alignment with said vertical axis.

3. In a wheeled drawn vehicle, the combination of a draft tongue pivotally secured to said vehicle for rotation about a vertical axis, a steering rod pivotally and slidably secured to said tongue for shifting movement into and out of pivotal alignment with said vertical axis, and means connecting with said steering rod and responsive to the direction of thrust on said tongue for effecting said movement.

4. A combination as defined in claim 3 including stop means for limiting the shifting movement of said steering rod.

5. A combination as defined in claim 3 including a locking member releasably engaging said means to selectively secure said steering rod against said shifting movement.

6. A combination as defined in claim 3 wherein said means comprises a tow bar slidably secured to said tongue for longitudinal movement relatively thereto, said tow bar being adapted for connection to a prime mover.

7. In a draft tongue for a wheeled vehicle, the combination of a tongue body rotatable about a fixed axis, a tow bar slidably secured to said tongue body for longitudinal movement relatively thereto, a steering rod pivotally secured to said tow bar for movement therewith into and out of pivotal alignment with said axis, and means for selectively locking said tow bar against said movement.

8. In a draft tongue for a drawn vehicle, the combination of a tongue body rotatable about a fixed axis, a tow bar slidably secured to said tongue body for longitudinal movement relatively thereto, and a steering rod connector secured to the end of said tow bar for movement therewith into and out of pivotal alignment with said axis.

9. In a draft tongue for a drawn vehicle, the combination of a tongue body, a shifter assembly pivotally movable about a vertical axis, means pivotally securing said tongue body to said shifter assembly for movement in a vertical plane, a tow bar slidably secured to said tongue body for longitudinal movement relative thereto, a steering rod connector movably secured to said shifter assembly for movement into and out of pivotal alignment with said vertical axis, and means pivotally securing said tow bar to said steering rod connector for movement in the plane of movement of said tongue body.

10. A combination as defined in claim 9 wherein said shifter assembly includes a track, and rollers engaging said track, said rollers being movable from a position coincident with said vertical axis to a position spaced radially therefrom.

11. A combination as defined in claim 10 wherein said steering rod connector comprises a shaft secured to said rollers for movement therewith.

12. A combination as defined in claim 11 including spaced abutments secured to said tongue body and engageable with said tow bar to limit the relative movement thereof.

13. A combination as defined in claim 11 including a latch element movably secured to said tongue body and engageable with said tow bar to lock said tow bar in selected positions relatively to said tongue body.

14. In a wheeled drawn vehicle, the combination of a draft member pivotally secured to said vehicle for movement about a vertical axis, a steering rod operatively connected to said draft member for steering movement in response to rotation of said member, and means for selectively shifting said steering rod into pivotal alignment with said axis to immobilize said steering rod.

References Cited in the file of this patent

UNITED STATES PATENTS

| | | |
|---|---|---|
| 1,510,543 | Cadman | Oct. 7, 1924 |
| 1,856,997 | Jacobs | May 3, 1932 |
| 2,608,417 | Kelsey | Aug. 26, 1952 |
| 2,650,100 | Ronning | Aug. 25, 1953 |